United States Patent
Qi et al.

(10) Patent No.: US 12,152,194 B2
(45) Date of Patent: Nov. 26, 2024

(54) LOW SURFACE TENSION SURFACTANT SYSTEM FOR ENHANCING FLOW-BACK PERFORMANCE

(71) Applicant: Saudi Arabian Oil Company, Dhahran (SA)

(72) Inventors: Ziyuan Qi, Beijing (CN); Rajendra Arunkumar Kalgaonkar, Dhahran (SA); Mohammed A. Bataweel, Dhahran (SA); Ming Han, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/177,577

(22) Filed: Mar. 2, 2023

(65) Prior Publication Data

US 2024/0294823 A1     Sep. 5, 2024

(51) Int. Cl.
| | |
|---|---|
| *C09K 8/68* | (2006.01) |
| *C09K 8/60* | (2006.01) |
| *C09K 8/80* | (2006.01) |
| *E21B 43/267* | (2006.01) |
| *E21B 43/26* | (2006.01) |

(52) U.S. Cl.
CPC ............... *C09K 8/68* (2013.01); *C09K 8/604* (2013.01); *C09K 8/80* (2013.01); *E21B 43/267* (2013.01); *C09K 2208/04* (2013.01); *C09K 2208/26* (2013.01); *C09K 2208/28* (2013.01); *E21B 43/2607* (2020.05)

(58) Field of Classification Search
None
See application file for complete search history.

(56) References Cited

U.S. PATENT DOCUMENTS

| | | | |
|---|---|---|---|
| 4,799,547 | A | 1/1989 | Borchardt |
| 5,441,541 | A | 8/1995 | Mehreteab et al. |
| 5,979,557 | A | 11/1999 | Card et al. |
| 6,306,800 | B1 | 10/2001 | Samuel et al. |
| 6,410,489 | B1 | 6/2002 | Zhang et al. |
| 6,637,517 | B2 | 10/2003 | Samuel et al. |
| 7,008,908 | B2 | 3/2006 | Chan et al. |
| 7,237,608 | B2 | 7/2007 | Fu et al. |
| 7,458,424 | B2 | 12/2008 | Odeh et al. |
| 7,533,723 | B2 | 5/2009 | Hughes et al. |

(Continued)

FOREIGN PATENT DOCUMENTS

| | | |
|---|---|---|
| CN | 201210239959 | 1/2014 |
| CN | 103540304 | 2/2017 |
| CN | 104232045 | 2/2017 |

OTHER PUBLICATIONS

Silicone Adjuvant for Agriculture TPD; <https://www.topsilicone.com/product/silicone-agricultual-adjuvant-tpd-348>; accessed Jan. 4, 2024. (Year: 2024).*

(Continued)

*Primary Examiner* — Andrew Sue-Ako
(74) *Attorney, Agent, or Firm* — Fish & Richardson P.C.

(57) ABSTRACT

A hydraulic fracturing fluid and methods for using the hydraulic fracturing fluid fracturing a formation are provided. An exemplary hydraulic fracturing fluid includes a polymer additive, a breaker, a non-ionic surfactant. The hydraulic fracturing fluid also includes an amphoteric surfactant, or a cationic surfactant, or both, and a base fluid.

24 Claims, 3 Drawing Sheets

(56) References Cited

U.S. PATENT DOCUMENTS

| | | | |
|---|---|---|---|
| 7,621,334 | B2 | 11/2009 | Welton et al. |
| 7,858,563 | B2 | 12/2010 | Hughes et al. |
| 7,875,575 | B2 | 1/2011 | Huang et al. |
| 7,989,404 | B2 | 8/2011 | Kakadjian et al. |
| 8,053,397 | B2 | 11/2011 | Huang et al. |
| 9,670,397 | B2 | 6/2017 | Ghumare et al. |
| 9,828,815 | B2 | 11/2017 | Silveira et al. |
| 10,266,748 | B2 | 4/2019 | Kalgaonkar et al. |
| 10,351,755 | B2 | 7/2019 | Wagle et al. |
| 10,407,609 | B2 | 9/2019 | Kalgaonkar et al. |
| 10,494,565 | B2 | 12/2019 | Wylde et al. |
| 10,995,261 | B2 | 5/2021 | Holtsclaw et al. |
| 11,203,712 | B1 | 12/2021 | Kalgaonkar et al. |
| 11,254,855 | B2 | 2/2022 | Xu et al. |
| 11,685,855 | B2 | 6/2023 | Kalgaonkar et al. |
| 2008/0311060 | A1 | 12/2008 | Sakuta et al. |
| 2011/0071056 | A1 | 3/2011 | Saini et al. |
| 2012/0085534 | A1 | 4/2012 | Morvan |
| 2013/0261033 | A1 | 10/2013 | Nguyen |
| 2015/0267104 | A1 | 9/2015 | Puerto et al. |
| 2016/0024370 | A1 | 1/2016 | Ba geri |
| 2016/0024891 | A1* | 1/2016 | Fursdon-Welsh ...... C09K 8/602 166/300 |
| 2019/0256458 | A1 | 8/2019 | Hussain et al. |
| 2019/0284467 | A1* | 9/2019 | Forbes .................... C09K 8/72 |
| 2021/0332307 | A1 | 10/2021 | Huff et al. |
| 2021/0380867 | A1 | 12/2021 | Kalgaonkar et al. |
| 2021/0380871 | A1 | 12/2021 | Kalgaonkar et al. |
| 2022/0298408 | A1* | 9/2022 | Nguyen ................ C09K 8/584 |
| 2023/0265334 | A1 | 8/2023 | Kalgaonkar et al. |

OTHER PUBLICATIONS

Brown et al., "Stimuli-Responsive Surfactants," Soft Matter, Jan. 23, 2013, 8:2365-74, 11 pages.

Chu et al., "A facile route towards the preparation of ultra-long-chain amidosulfobetaine surfactants," Synlett, 2009, 16:2655-2658, 4 pages.

Guo et al., "Temperature-Resistant and Salt-Tolerant Mixed Surfactant System for EOR in the Tahe Oilfield," Petroleum Science, Jul. 21, 2020, 18:667-78, 12 pages.

He et al., "Unique Mixtures of Anionic/Cationic Surfactants: A New Approach to Enhance Surfactant Performance in Liquids-Rich Shale Reservoirs," SPE Production & Operations, May 14, 2018, 33(02):363-70, 8 pages.

Howard et al., "Comparison of Flowback Aids: Understanding Their Capillary Pressure and Wetting Properties," presented at the SPE European Formation Damage Conference, Lafayette, Louisiana, May 27, 2009, 12 pages.

Jia et al., "Systematic Investigation of the Effects of Mixed Cationic/Anionic Surfactants on the Interfacial Tension of a Water/Model Oil System and their Application to Enhance Crude Oil Recovery," Colloids and Surfaces A: Physicochemical and Engineering Aspects, Sep. 20, 2017, 529:621-7, 7 pages.

Li et al., "Mixtures of Anionic/Cationic Surfactants: A New Approach for Enhanced Oil Recovery in Low-Salinity, High-Temperature Sandstone Reservoir," SPE Journal, Aug. 15, 2016, 21(04): 1164-77, 14 pages.

Liang et al., "Identifying and Evaluating Surfactant Additives to Reduce Water Blocks After Hydraulic Fracturing for Low Permeability Reservoirs," presented at the SPE Improved Oil Recovery Conference, Tulsa, Oklahoma, Apr. 11, 2016, 19 pages.

Mahmoudkhani et al., "Microemulsions as Flowback Aids for Enhanced Oil and Gas Recovery After Fracturing, Myth or Reality: A Turnkey Study to Determine the Features and Benefits," presented at the SPE International Symposium on Oilfield Chemistry, Woodlands, Texas, Apr. 13-15, 2015, 21 pages.

Rabie et al., "Evaluation of a New Environmentally Friendly Flowback Surfactant and Its Application to Enhance Oil and Gas Productivity," presented at the SPE Middle East Oil and Gas Show and Conference, Manama, Bahrain, Mar. 18-21, 2019, 15 pages.

Rabie et al., "New Insights in the Characteristics Required for A Successful Flowback Surfactant and Its Use in Tight and Unconventional Reservoirs," presented at the International Petroleum Technology Conference, Beijing, China, Mar. 22, 2019, 16 pages.

Shuler et al., Surfactant Huff-n-Puff Application Potentials for Unconventional Reservoirs, presented at the Improved Oil Recovery Conference, Tulsa, Oklahoma, Apr. 11-13, 2016, 14 pages.

Wazir et al., "New Formulation of Ultra-Low Ift Surfactant for Potential Eor Application," presented at the Offshore Technology Conference Asia, Kuala Lumpur, Malaysia, Mar. 22-25, 2022, 17 pages.

Wu et al., "Study of New Type of Temperature-Resistant and Salt-Tolerant Surfactant for Polymer/Surfactant Two-Component Flooding System," presented at the 2010 Asia-Pacific Power and Energy Engineering Conference, Chengdu, China, Mar. 28, 2010, 4 pages.

Yue et al., "Multifunctional Fracturing Additives as Flowback Aids" presented at the SPE Annual Technical Conference and Exhibition, Sep. 26-28, 2016, Dubai, UAE, 12 pages.

Zhang et al., "Unique Flow-Back Chemistry for Enhancing Productivity of Low-Permeability Reservoir," presented at the IADC/SPE Asia Pacific Drilling Technology Conference and Exhibition, Tianjin, China, Jul. 9, 2012, 8 pages.

TopSilicone.com [online], "Silicone Adjuvant for Agriculture TPD," retrieved on Jan. 17, 2023, retrieved from URL <https://www.topsilicone.com/product/silicone-agricultual-adjuvant-tpd-348>; 6 pages.

* cited by examiner

LOW SURFACE TENSION SURFACTANT SYSTEM FOR ENHANCING FLOW-BACK PERFORMANCE

TECHNICAL FIELD

This disclosure relates to surfactant blends as flow-back aids during fracturing.

BACKGROUND

Hydraulic fracturing is the high pressure pumping of a fracturing fluid into a formation to create cracks, or fractures, to stimulate the production of an oil or gas well. Proppants, such as sand, that are suspended in the fracturing fluid are deposited in the cracks to prevent reclosing as a portion of the fracturing fluid flows back out of the well. Fracturing is used to increase the production rate in many formations, and make the development of many wells economical. Further, hydraulic fracturing has enabled the production of hydrocarbons from unconventional resources such as shale gas, shale oil, and coal bed methane.

After hydraulic fracturing, the injected fluid is recovered, at least to the maximum extent possible, as the residual fracturing fluid remaining in the formation will gradually block the flow of hydrocarbons. Typically, some of the fracturing fluid is lost in the formation, but 25% to 50% of it returns to surface within one to three months.

SUMMARY

An embodiment described herein provides a hydraulic fracturing fluid. The hydraulic fracturing fluid includes a polymer additive, a breaker, a non-ionic surfactant. The hydraulic fracturing fluid also includes an amphoteric surfactant, or a cationic surfactant, or both, and a base fluid.

Another embodiment described herein provides a method for fracturing a formation using a surfactant blend as a flow-back enhancer. The method includes preparing the surfactant blend in a base fluid, wherein the surfactant blend includes a first surfactant including a non-ionic surfactant and a second surfactant including a cationic surfactant, a zwitterionic surfactant, or both. The method further includes, mixing a fracturing fluid including the surfactant blend, suspending a proppant in the fracturing fluid, and injecting the fracturing fluid into the formation.

DETAILED DESCRIPTION

Embodiments described herein provide a mixture of functional surfactants as flow-back enhancer for hydraulic fracturing in reservoir stimulation. Flow enhancers can be used to assist the flow back of the fracturing fluid. They can prevent emulsions when water-based fracturing fluids mix with residual oil in the formation. Further, the flow-back enhancers reduce the surface tension, mediating capillary pressure, wetting properties, and adverse gas-water surface tension in rock formations, thereby improving the flow-back rate of broken fracturing fluid. As used herein, the broken fracturing fluid includes a degraded polymer, for example, broken down over time by an oxidative compound. In various embodiments, the degraded polymer may be the remains of a slickwater, or friction-reducing polymer, or the remains of a viscosifier, or gelling polymer.

Flow-back enhancers have typically been surfactants that are added into the fracturing fluid. Conventional surfactants usually have surface tension in the range of about 30-35 mN/m at 0.3 wt. % concentration. The surfactant blend described in embodiments herein has a surface tension below about 22 mN/m at about 0.3 wt. % concentration. The surfactant blend has enhanced flow-back enhancement from the synergistic effects of two surfactants, which generates low surface tension with improved compatibility in aqueous base fluids such as brine. The surfactant blend reduces the surface tension of the liquid mixture while overcoming poor solubility of organosilicon surfactants.

Slickwater fracturing has been widely used in the stimulation of shale gas and tight oil production. In slickwater fracturing, a friction-reducing additive, such as a polymer, is added to the fracturing fluid to lower the friction during pumping of the fracturing fluid into the well, which lowers the energy required to achieve the pressures needed for fracturing. A breaker is generally added to the fracturing fluid to degrade the friction-reducing additive at the downhole temperature of the well, protecting the formation from damage. Thus, the flow-back enhancer is generally designed to aid the flow back of the broken fracturing fluid.

Figure 1:
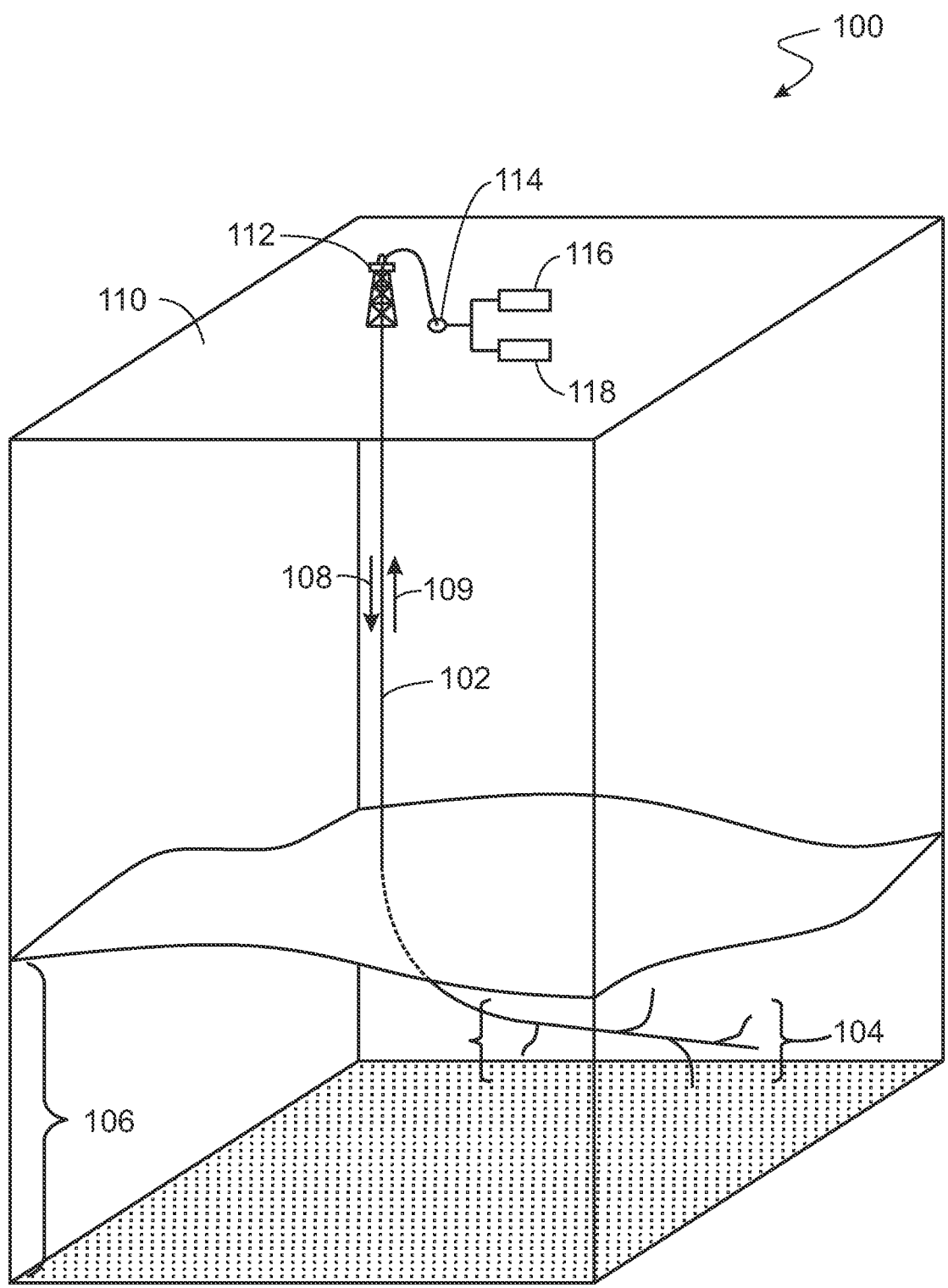
FIG. 1 is a simplified schematic drawing of a wellbore illustrating the formation of fractures in a formation from a fracturing operation.

FIG. 1 is a schematic drawing 100 of a wellbore 102 illustrating the formation of fractures 104 in a formation 106 from a fracturing operation. As described herein, hydraulic fracturing is an operation in which a fracturing fluid 108 is pumped into the formation 106 through the wellbore 102 at high pressure and high volume to create the fractures 104. Generally, proppants are carried by the fracturing fluid to the fractures 104 and are deposited therein, holding the fractures 104 open after the pressure is released. If proppants were not used, the fractures 104 would decrease in size and may close and seal shut. Well treatment chemicals are often used during the fracturing process.

As used herein, a well treatment chemical is a chemical that interacts with the rock, fluids, or mechanical structures in a well. For example, a well treatment chemical includes the breaker and the flow-back enhancer. Other well treatment chemicals that may be used include acids, solvents, chelating agents, gel breakers, foaming agents, or the like. In some embodiments, the well treatment chemical includes a blend of surfactants as the flow-back enhancer, as discussed further with respect to FIG. 2. Further, well treatment chemicals include materials that protect tubulars and other structures in the well, such as corrosion inhibitors and the like.

Proppants can include silica sand, coated silica sand, ceramic particles, sintered bauxite, or any number of other natural or synthetic materials, such as ground nutshells, and the like. The proppant particles can have various sizes, shapes, and strengths as determined by the depth of the formation, rock types, fracturing pressure, temperature, and the like.

The fracturing fluid 108 that is used to form the fractures and carry the proppants to the fractures includes water-based fluids, oil-in-water emulsions, water-in-oil emulsions, and the like. In some examples, the fracturing fluid 108 includes a water-based fluid comprising a dissolved gelling compound, such as guar gum or other polysaccharides, that is added to the fracturing fluid 108 with a cross-linking agent, such as a borate compound, to increase the viscosity of the fracturing fluid 108. This can be used to enhance the amount of proppant particles that can be carried by the fluid. In other examples, the fracturing fluid 108 is a slickwater that includes friction-reducing polymers, such as polyacrylamides, that are not gelled, but are utilized to allow higher pumping rates at lower power. In some embodiments, the fracturing fluid includes a surfactant blend as a flow-back enhancer to increase the amount of the fracturing fluid 108 that is recovered from the well as flow back fluid 109. Other additives that can be added to the fracturing fluid 108 include biocides, corrosion inhibitors, and the like.

The fracturing fluid 108 is pumped from the surface 110 using apparatus coupled to the wellbore 102. In examples this may include a wellhead 112 coupled to the wellbore 102 and a slurry pump 114. The slurry pump 114 is used to pump fracturing fluid 108 from tanks 116 and 118. In some examples, the tanks 116 and 118 both contain a slurry that includes a fracturing fluid that includes blended proppants. In other examples, one tank 116 or 118 includes a slurry of proppants, while the other tank includes the base fluid, surfactant blend, and other chemicals for the fracturing fluid 108. In these examples, the slurry pump 114 combines the material from the tanks 116 and 118 for injection into the well 102. It would be understood by one of ordinary skill in the art that the schematic drawing 100 is simplified, and that the equipment at the surface will include additional units not shown, such as multiple tanks, multiple slurry pumps, blending apparatus, control systems, valve systems, and the like.

Further apparatus at the surface can be used to collect flow back fluids 109 immediately after the fracturing, for example, in the first few hours or days after the fracturing. Once the well is placed in production, produced water and the remaining flow back fluids 109 are separated from produced hydrocarbons prior to processing the hydrocarbons.

Figure 2:
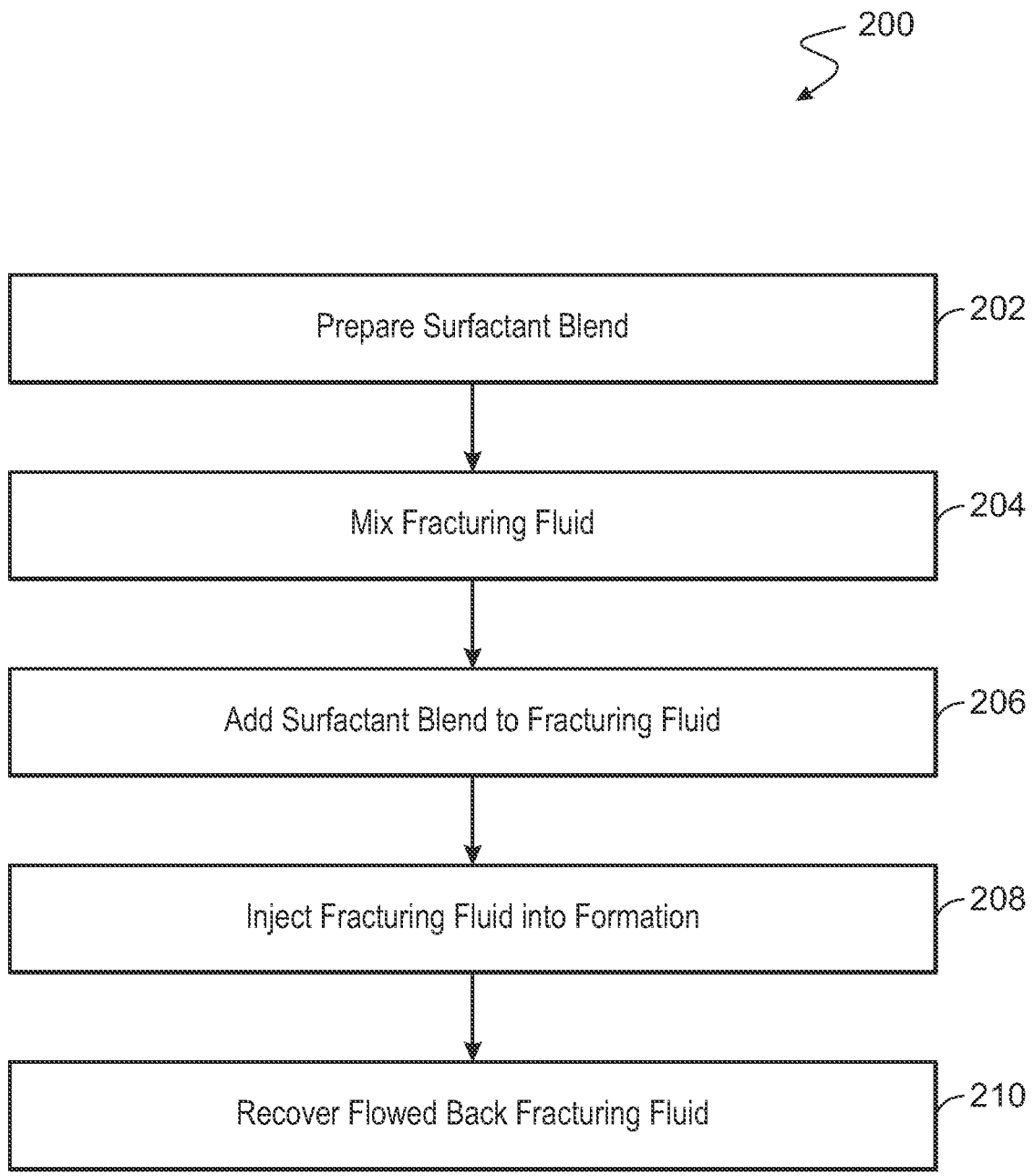
FIG. 2 is a process flow diagram of a method for treating a formation with a fracturing fluid that includes a surfactant blend as a flow-back enhancer.

FIG. 2 is a process flow diagram of a method 200 for treating a formation with a fracturing fluid that includes a surfactant blend as a flow-back enhancer. The method begins at block 202 with the preparation of the surfactant blend. In some embodiments, the surfactant blend is made directly in the base fluid, either before or after adding additional ingredients.

In some embodiments, the base fluid is an aqueous fluid, such as a brine. In various embodiments, the salinity of the brine is in a range of about 1000 ppm to about 50,000 ppm, or about 2000 ppm to about 25,000 ppm, or about 3000 ppm to about 15,000 ppm. In some embodiments, the salinity is about 4000 ppm, about 4050 ppm, about 4070 ppm, or about 5000 ppm. The hardness of the base fluid may range from about 50 ppm to about 1000 ppm, or about 250 ppm to about 750 ppm, or about 500 ppm to about 600 ppm. In some embodiments, the hardness of the base fluid is about 500 ppm, or about 525 ppm, or about 575 ppm, or about 600 ppm. In some embodiments, the hardness of the base fluid is 523 ppm.

The surfactant blend includes a first surfactant that is a nonionic surfactant and a second surfactant that is a zwitterionic (amphoteric) surfactant, a cationic surfactant, or both. In some embodiments, the nonionic surfactant is 2-[hydroxy (polyethyleneoxy) propyl]heptamethyltrisiloxane (HPTSO). In some embodiments, the amphoteric surfactant is 3-(N,N-dimethyltetradecylammonio) propanesulfonate (SB3-14). In some embodiments, the cationic surfactant is cetyl trimethylammonium bromide (CTAB), dodecyltrimethylammonium bromide (DTAB), or a blend of both.

HTPSO has very low surface tension of about 20.5 mN/m at 0.3 wt. %. However, HTPSO has poor solubility in water or brine, as shown by the cloudiness of solutions of HTPSO in water. The zwitterionic and cationic surfactants have better solubility in water, but have relatively higher surface tension than HPTSO.

In various embodiments described herein, the HPTSO in a blend with at least one of the surfactants, SB3-14, CTAB, or DTAB, provides better solubility than HPTSO alone in brine or water while maintaining a low surface tension. The mixing ratio of the first surfactant, HPTSO, and the second surfactant, SB3-14, CTAB, DTAB, or combinations, is between about 3:1 to 1:9. In various embodiments, the mixing ratio is about 3:1, or about 2:1, or about 2:3, or about 1 to 1, or about 1:2, or about 1:3, or about 1:4, or about 1:9. The total concentration of the surfactant blend in water varies from about 0.01 wt. % to about 1 wt. %. In various embodiments, the total concentration surfactant blend is about 0.01 wt. %, about 0.05 wt. %, about 0.1 wt. %, about 0.3 weight %, about 0.5 wt. %, about 0.75 wt. %, or about 1.0 wt. %.

The formulation can be used in a temperature range from about 15° C. to about 95° C., from about 20° C. to about 50° C., or from about 20° C. to about 30° C. In various embodiments, the formulation is used at a temperature of about 25° C.

At block 204, a fracturing fluid is mixed. Mixing the fracturing fluid is performed by incorporating fracturing chemicals into the base fluid, for example, with the surfactant blend. The base fluid may be water, or an emulsion of oil and water. The fracturing chemicals can include a slickwater additive, gelling polymer, a cross-linker, a friction reducing polymer, a biocide, an acid, surfactants, stabilizer, breaker, pH buffer, clay stabilizer or a chelating agent, or any combinations thereof. In some embodiments, the slickwater additive is a polyacrylamide. In some embodiments, the gelling polymer is a polysaccharide, such as guar gum, hydroxymethyl cellulose, and the like.

The fracturing fluids can be energized or foamed with $N_2$ and/or $CO_2$, for example, directly with compressed gas creating a foam, or by the addition of chemicals that degrade to release $N_2$ or $CO_2$, at temperatures in the well bore. If the surfactant blend has not already be incorporated into the base fluid, it may be added with the other fracturing chemicals.

At block 206, proppants are suspended in the fracturing fluid. In some embodiments, the proppants are suspended in the fracturing fluid by mixing the proppants into a fracturing fluid stream during the injection of the fracturing fluid into the formation. In some embodiments, the proppants are suspended in the fracturing fluid by mixing the proppants into a tank holding the mixed fracturing fluid.

At block 208, the fracturing fluid is injected into the formation. In some embodiments, the fracturing fluid is injected into the formation using a high-pressure pump to create fractures and to place the proppants into the fractures.

At block 210, the injection is halted, and the fracturing fluid is allowed to flow back to the surface. The fracturing fluid may be purified and reused for further operations. In some embodiments, ongoing recovery of the fracturing fluid is performed by separating the fluid from hydrocarbons brought to the surface.

EXAMPLES

As described in Example 4, the surfactant blend increases the flow-back rate of broken slickwater by 20% in a proppant packed column, without increasing formation damage, for example, by lowering rock permeability. In these examples, the chemicals are dissolved in synthetic brine with a salinity of 4070 ppm and hardness of 523 ppm.

Surface Tension Tests of Surfactants

The surface tensions of HPTSO, SB3-14 and the mixture of HPTSO and SB3-14 were tested at 25° C. using a surface tensiometer, model DCAT21 from DataPhysics Instruments GmbH of Filderstadt, Germany. The detailed surface tension test results are listed in Table 1-Table 3.

Table 1 shows the surface tension of HPTSO in synthetic brine at different concentrations. As shown, as the concentration increases, the surface tension of HPTSO decreases, leveling off at about 20.5 mN/m at concentrations above about 0.1 wt. %. Although the values for surface tension are low, HPTSO is poorly soluble in brine. This is indicated by the cloudiness of mixtures of HPTSO in brine, indicating the formation of precipitated particles or emulsified droplets in the solution. The cloudy solution has limited flow-back enhancement of about 12.9% as shown in Example 2 and may cause formation damage.

Table 2 shows the surface tension of SB3-14 in synthetic brine at different concentrations. Similarly to HPTSO, as the concentration increases, the surface tension of SB3-14 generally, leveling off at about 37 mN/m when concentration is above about 0.1 wt. %. Because of the relatively high surface tension, the flow-back enhancement was only 1.7% as shown in Example 3.

Table 3 shows the surface tension of the surfactant mixture HPTSO and SB3-14. The total concentration was fixed at 0.3 wt. %, although different ratios of HPTSO and SB3-14 were tested, as shown in the table. When the mass ratio of HPTSO to SB3-14 was reduced from about 9:1 to about 2:3, the surface tension of the system remained at less than about 22 mN/m. As the mass ratio was reduced to about 1:1, the surface tension increased to about 22.629 mN/m. As the mass ratio was further reduced to about 1:9, the surface tension was increased to about 28.60 mN/m. When the mass ratio of HPTSO to SB3-14 was lower than about 3:1, the mixture was compatible with the brine, as shown by a clear mixture. In comparison, mass ratios of HPTSO to SB3-14 greater than about 4:1 were cloudy, indicating poor compatibility. The compatibility and low surface tension contributed to flow-back rate enhancements of over 20% without formation damage.

TABLE 1

The surface tension results of HPTSO

| Chemical conc., wt. % | Surface tension, mN/m |
|---|---|
| 0.3 | 20.43 |
| 0.1 | 20.97 |
| 0.01 | 21.56 |
| 0.005 | 23.13 |
| 0.001 | 31.87 |
| 0.0001 | 46.11 |

TABLE 2

The surface tension results of SB3-14

| Chemical conc., wt. % | Surface tension, mN/m |
|---|---|
| 0.3 | 37.038 |
| 0.1 | 37.390 |
| 0.01 | 37.719 |
| 0.005 | 41.885 |
| 0.001 | 49.001 |
| 0.0001 | 63.016 |

TABLE 3

The surface tension results of HPTSO/SB3-14 (total concentration 0.3 wt. %)

| Chemical formulation | Surface tension, mN/m | Compatibility |
|---|---|---|
| HPTSO + SB3-14(Mass ratio 9:1) | 20.516 | Cloudy |
| HPTSO + SB3-14(Mass ratio 4:1) | 20.819 | Cloudy |
| HPTSO + SB3-14(Mass ratio 3:1) | 20.966 | Clear |
| HPTSO + SB3-14(Mass ratio 2:1) | 21.482 | Clear |
| HPTSO + SB3-14(Mass ratio 2:3) | 21.935 | Clear |
| HPTSO + SB3-14(Mass ratio 1:1) | 22.629 | Clear |
| HPTSO + SB3-14(Mass ratio 1:2) | 24.199 | Clear |
| HPTSO + SB3-14(Mass ratio 1:3) | 25.109 | Clear |
| HPTSO + SB3-14(Mass ratio 1:4) | 26.252 | Clear |
| HPTSO + SB3-14(Mass ratio 1:9) | 28.604 | Clear |

Figure 3:
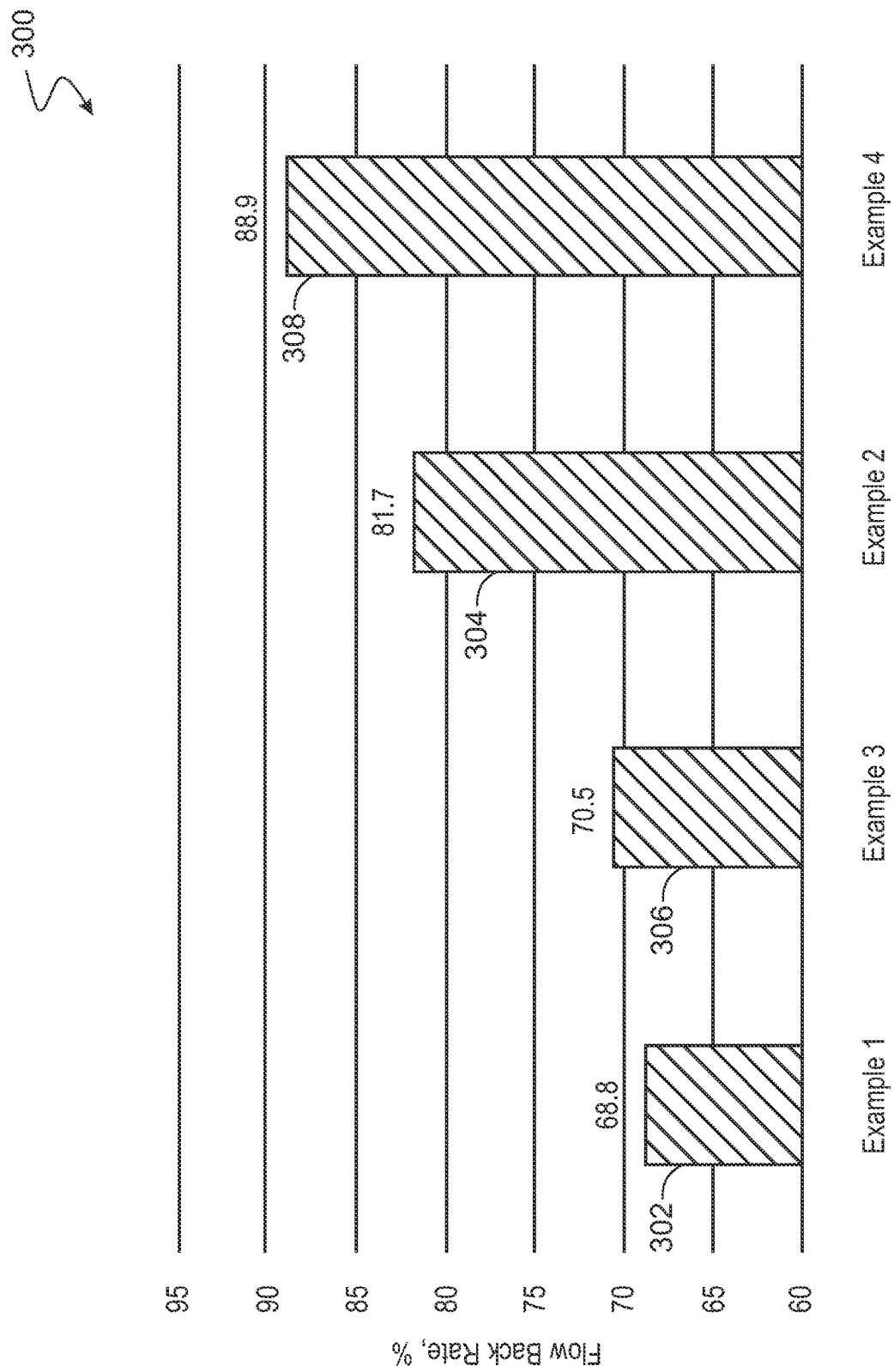
FIG. 3 is a plot of flow-back rates using different formulations of the surfactants.

FIG. 3 is a plot 300 of flow-back rates using different formulations of the surfactants. In the plot 300, the control of Example 1 302 had no flow-back enhancer. In Example 2 304, the HPTSO was tested at 0.3 weight percent. In Example 3 306, the SB3-14 was also tested at 0.3 wt. %. In Example 4 308, the surfactant blend was tested at a 0.3 wt. % of total surfactant with a mass ratio of HPTSO to SB3-14 of 3:2.

Example 1 302: Permeability Restoration and Flow-Back Rate Using Broken Friction Reducer Solution To conduct the tests, a broken slickwater solution was prepared by dissolving 0.1 wt. % friction reducer (anionic polyacrylamide in examples herein) and 0.025 wt. % breaker (ammonium persulfate in examples herein) in synthetic brine. As used herein, weight percent (wt. %) is defined the mass of the chemical versus the volume of the brine solution, for example, a 0.1 wt. % Solution of friction reducer is made by dissolving 0.1 g of friction reducer in 100 mL of brine. The simulated solution was then heated at 82° C. for one hour to form the broken slickwater solution.

The tests described in Examples 1-4 were conducted using a proppant packed column to simulate fracture during flow-back rate test. The proppant used had a particle size of 40-70 mesh (0.210 mm to 0.420 mm). The column was a glass tube with an inner diameter of 2.5 cm and a length of 30 cm. Plastic stoppers were used to plug the ends of the glass tube.

For each test, the column was filled with the proppant, and the total weight $m_1$ was measured. The column was then oriented vertically, and the broken slick water solution was flowed into the base of the column by gravity, saturating the column from bottom to top. The flow was continued for 10 minutes after water flowed out the top of column, after which the total weight $m_2$ was measured. The column was then oriented horizontally, and nitrogen was blown from one end to the other end using 10 kPa pressure for 5 minutes. The mass $m_3$ of the produced liquid was recorded.

The flow-back rate $\eta_f$ can be calculated using equation (1):

$$\eta_f = \frac{m_3}{m_2 - m_1} \times 100\% \quad (1)$$

In the absence of surfactant, the flow back rate of broken friction reducer solution in proppant packed column was 68.8%.

Berea core plugs were used to test formation damage effect of flow-back enhancers. For this test, the Berea core plug was saturated with the synthetic brine, and the initial permeability, Ki, was measured by flowing the synthetic brine into the core. After the initial permeability was measured, a solution including 0.1 wt. % of the friction reducer and 0.025 wt. % of the breaker were dissolved in synthetic brine. The solution was heated at 82° C. for 1 hour. The ammonium persulfate will break the friction reducer molecular structure, and the heated mixture was referred to as broken friction reducer solution.

The core plug was flooded with six pore volumes (PV) of broken friction reducer solution. The pore volume was determined in this way by measuring the weight difference ($\Delta m$) of a core before and after saturating the core with brine. Then the pore volume (PV) is calculated by dividing $\Delta m$ of core plug by the density of the brine ($\rho$), e.g., PV=$\Delta m/\rho$.

The plug was then flushed with synthetic brine and the permeability was measured again as $K_a$. Finally the permeability restoration $\eta_a$ can be calculated using equation (2):

$$\eta_a = \frac{k_a}{k_i} \times 100\% \quad (2)$$

The permeability restoration of broken friction reducer solution without any flow-back enhancer in Berea core plug was 91%.

Example 2 304: Flow-Back Rate Using 0.3 wt. % HPTSO

Further flow-back rate tests of the flow-back rate tests were conducted at 25° C. using proppant pack columns prepared as described with respect to Example 1 302. The broken slickwater solution for this example was prepared by dissolving 0.1 wt. % of the friction reducer, 0.025 wt. % of the breaker, and 0.3 wt. % of the HPTSO in the synthetic brine. The broken slickwater solution was mixed and then heated at 82° C. for 1 hour. As described herein, the surface tension of the mixture was 22.03 mN/m. The flow-back rate of the mixture in proppant packed column was 81.70%, which was improved by 12.9% compared with broken friction reducer solution. This shows that HPTSO alone has moderate flow-back rate enhancement.

Example 3 306: Flow-Back Rate Using 0.3 wt. % SB3-14

The flow-back rate test of Example 3 was conducted at 25° C. using the same column and methods described with respect to Example 1. The broken slickwater solution for this example was prepared by dissolving 0.1 wt. % of the friction reducer, 0.025 wt. % of the breaker, and 0.3 wt. % SB3-14 in synthetic brine. The broken slickwater solution was mixed and then heated at 82° C. for 1 hour. The surface tension of the mixture was 37.04 mN/m. The flow-back rate of the mixture in the proppant packed column was 70.5%, which was improved by only 1.7% compared with broken friction reducer solution. Thus, SB3-14 alone has a low flow-back rate enhancement.

Example 4 308: Flow-Back Rate Using 0.3 wt. % of a Mixture of HPTSO and SB3-14 at a Mass Ratio 3:2

The surfactant blend was tested using the same column and methods described with respect to Example 1. The broken slickwater solution for this example was prepared by dissolving 0.1 wt. % of the friction reducer, 0.025 wt. % of the breaker, and 0.3 wt. % of a combination of HPTSO and SB3-14, at a mass ratio of 3:2, in the synthetic brine. The broken slickwater solution was mixed and then heated at 82° C. for 1 hour. The surface tension of the mixture was 22.45 mN/m. The flow-back rate of the mixture in the proppant packed column was 88.86%, which was improved by 20.02% compared with broken friction reducer solution, as shown in FIG. 3. The permeability restoration of broken friction reducer solution with proposed formulation in Berea core plug was 99.5%, indicating no formation damage.

EMBODIMENTS

An embodiment described herein provides a hydraulic fracturing fluid. The hydraulic fracturing fluid includes a polymer additive, a breaker, a non-ionic surfactant. The hydraulic fracturing fluid also includes an amphoteric surfactant, or a cationic surfactant, or both, and a base fluid.

In an aspect, the polymer additive includes a slickwater additive. In an aspect, the slickwater additive includes anionic polyacrylamide.

In an aspect, the polymer additive includes a gelling polymer. In an aspect, the gelling polymer includes a polysaccharide. In an aspect, the gelling polymer includes guar gum.

In an aspect, the breaker includes ammonium persulfate.

In an aspect, the non-ionic surfactant includes 2-[hydroxy(polyethyleneoxy)propyl]heptamethyltrisiloxane.

In an aspect, the amphoteric surfactant includes 3-(N,N-dimethyl tetradecylammonio)propanesulfonate.

In an aspect, the cationic surfactant includes cetyl trimethylammonium bromide, or dodecyltrimethylammonium bromide, or both.

In an aspect, the base fluid includes a brine.

In an aspect, the hydraulic fracturing fluid includes a proppant. In an aspect, the proppant includes silica sand. In an aspect, the proppant includes ceramic, sintered bauxite, or nutshells, or any combination thereof.

In an aspect, the hydraulic fracturing fluid includes a chelating agent, a solvent, a foaming agent, or an encapsulated gas, or any combinations thereof.

Another embodiment described herein provides a method for fracturing a formation using a surfactant blend as a flow-back enhancer. The method includes preparing the surfactant blend in a base fluid, wherein the surfactant blend includes a first surfactant including a non-ionic surfactant and a second surfactant including a cationic surfactant, a zwitterionic surfactant, or both. The method further includes, mixing a fracturing fluid including the surfactant blend, suspending a proppant in the fracturing fluid, and injecting the fracturing fluid into the formation.

In an aspect, the method includes recovering the fracturing fluid returned to the surface.

In an aspect, the method includes mixing a friction-reducing additive with the fracturing fluid. In an aspect, the friction-reducing additive includes anionic polyacrylamide.

In an aspect, the method includes mixing a breaker with the fracturing fluid. In an aspect, the breaker includes ammonium persulfate.

In an aspect, the method includes incorporating fracturing chemicals into the base fluid, wherein the fracturing chemicals include a biocide, a stabilizer, a pH buffer, an acid, or a chelating agent, or any combinations thereof.

In an aspect, the method includes incorporating foaming agents into the fracturing fluid, wherein the foaming agents decompose to release $N_2$, or $CO_2$, or both.

In an aspect, the method includes suspending the proppant in the fracturing fluid by mixing the proppant into a fracturing fluid stream during the injection of the fracturing fluid into the formation. In an aspect, the method includes suspending the proppant in the fracturing fluid by mixing the proppant into a tank holding the mixed fracturing fluid.

In an aspect, injecting the fracturing fluid into the formation includes using a high-pressure pump to create fractures and to place the proppant into the fractures.

In an aspect, the non-ionic surfactant includes 2-[hydroxy (polyethyleneoxy)propyl]heptamethyltrisiloxane.

In an aspect, the zwitterionic surfactant includes 3-(N,N-dimethyltetradecylammonio)propanesulfonate.

In an aspect, the cationic surfactant includes cetyl trimethylammonium bromide, or dodecyltrimethylammonium bromide, or both.

In an aspect, the base fluid includes a brine.

Other implementations are also within the scope of the following claims.

What is claimed is:

1. A hydraulic fracturing fluid, comprising:
a polymer additive;
a breaker;
a non-ionic surfactant, wherein the non-ionic surfactant comprises 2-[hydroxy(polyethyleneoxy)propyl]heptamethyltrisiloxane (HPTSO);
an amphoteric surfactant, wherein the amphoteric surfactant comprises 3-(N,N-dimethyltetradecylammonio) propanesulfonate (SB3-14); and
a base fluid, wherein the base fluid comprises a brine;
wherein a mass ratio of HPTSO to SB3-14 is less than 3 to 1.

2. The hydraulic fracturing fluid of claim 1, wherein the polymer additive comprises a slickwater additive.

3. The hydraulic fracturing fluid of claim 2, wherein the slickwater additive comprises anionic polyacrylamide.

4. The hydraulic fracturing fluid of claim 1, wherein the polymer additive comprises a gelling polymer.

5. The hydraulic fracturing fluid of claim 4, wherein the gelling polymer comprises a polysaccharide.

6. The hydraulic fracturing fluid of claim 4, wherein the gelling polymer comprises guar gum.

7. The hydraulic fracturing fluid of claim 1, wherein the breaker comprises ammonium persulfate.

8. The hydraulic fracturing fluid of claim 1, further comprising a cationic surfactant, wherein the cationic surfactant comprises cetyl trimethylammonium bromide, or dodecyltrimethylammonium bromide, or both.

9. The hydraulic fracturing fluid of claim 1, comprising a proppant.

10. The hydraulic fracturing fluid of claim 9, wherein the proppant comprises silica sand.

11. The hydraulic fracturing fluid of claim 9, wherein the proppant comprises ceramic, sintered bauxite, or nutshells, or any combination thereof.

12. The hydraulic fracturing fluid of claim 1, comprising a chelating agent, a solvent, a foaming agent, or an encapsulated gas, or any combinations thereof.

13. A method for fracturing a formation using a surfactant blend as a flow-back enhancer, comprising:
preparing the surfactant blend in a base fluid, wherein the base fluid comprises a brine, wherein the surfactant blend comprises a first surfactant comprising a non-ionic surfactant, wherein the non-non-ionic surfactant comprises 2-[hydroxy (polyethyleneoxy)propyl]heptamethyltrisiloxane (HPTSO) and a second surfactant comprising a zwitterionic surfactant, wherein the zwitterionic surfactant comprises 3-(N,N-dimethyltetradecylammonio) propanesulfonate (SB3-14), wherein a mass ratio of HTPSO to SB3-14 is less than 3 to 1;
mixing a fracturing fluid comprising the surfactant blend;
suspending a proppant in the fracturing fluid; and
injecting the fracturing fluid into the formation.

14. The method of claim 13, comprising recovering the fracturing fluid returned to the surface.

15. The method of claim 13, comprising mixing a friction-reducing additive with the fracturing fluid.

16. The method of claim 15, wherein the friction-reducing additive comprises anionic polyacrylamide.

17. The method of claim 15, comprising mixing a breaker with the fracturing fluid.

18. The method of claim 17, wherein the breaker comprises ammonium persulfate.

19. The method of claim 15, wherein injecting the fracturing fluid into the formation comprises using a high-pressure pump to create fractures and to place the proppant into the fractures.

20. The method of claim 13, comprising incorporating fracturing chemicals into the base fluid, wherein the fracturing chemicals comprise a biocide, a stabilizer, a pH buffer, an acid, or a chelating agent, or any combinations thereof.

21. The method of claim 13, comprising incorporating foaming agents into the fracturing fluid, wherein the foaming agents decompose to release $N_2$, or $CO_2$, or both.

22. The method of claim 13, comprising suspending the proppant in the fracturing fluid by mixing the proppant into a fracturing fluid stream during the injection of the fracturing fluid into the formation.

23. The method of claim 13, comprising suspending the proppant in the fracturing fluid by mixing the proppant into a tank holding the mixed fracturing fluid.

24. The method of claim 13, wherein the surfactant blend further comprises a cationic surfactant, wherein the cationic surfactant comprises cetyl trimethylammonium bromide, or dodecyltrimethylammonium bromide, or both.

* * * * *

UNITED STATES PATENT AND TRADEMARK OFFICE
CERTIFICATE OF CORRECTION

PATENT NO. : 12,152,194 B2
APPLICATION NO. : 18/177577
DATED : November 26, 2024
INVENTOR(S) : Ziyuan Qi et al.

Page 1 of 1

It is certified that error appears in the above-identified patent and that said Letters Patent is hereby corrected as shown below:

In the Claims

In Column 9, Line 50, Claim 1, please replace "HTPSO" with -- HPTSO --.

In Column 10, Line 19, Claim 13, please replace "non-non-ionic" with -- non-ionic --.

In Column 10, Line 25, Claim 13, please replace "HTPSO" with -- HPTSO --.

Signed and Sealed this
Eighteenth Day of February, 2025

Coke Morgan Stewart
*Acting Director of the United States Patent and Trademark Office*